J. PIZZICA.
DRYING APPARATUS.
APPLICATION FILED AUG. 27, 1912.
1,070,173.
Patented Aug. 12, 1913.
2 SHEETS—SHEET 1.
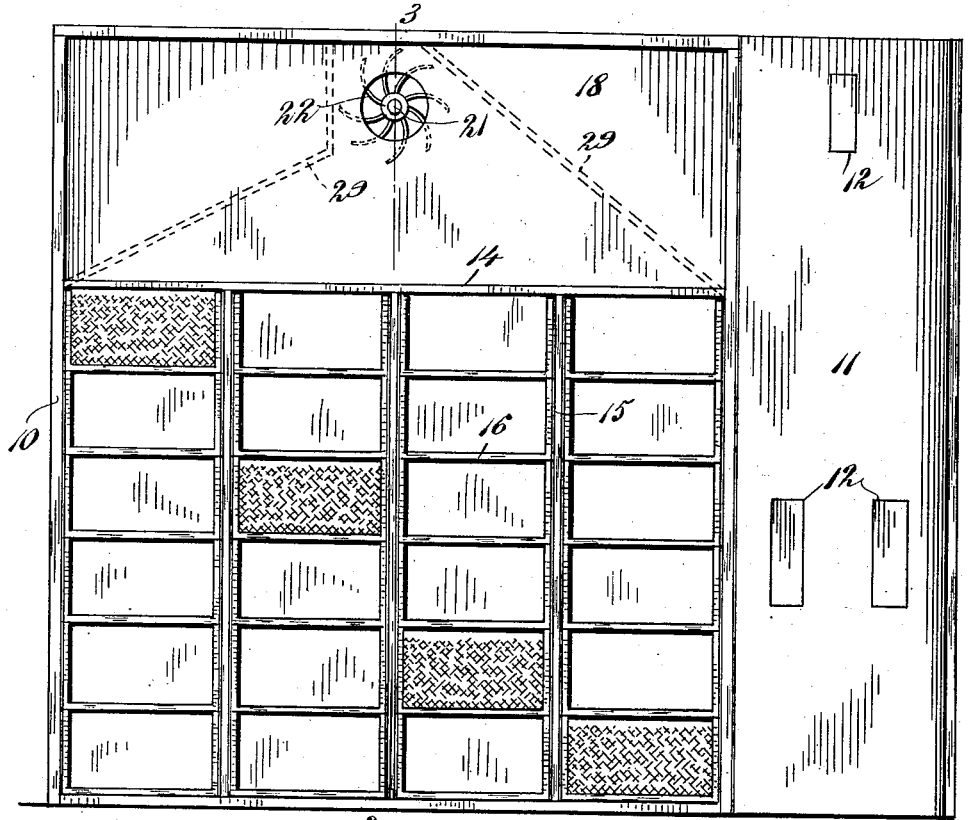
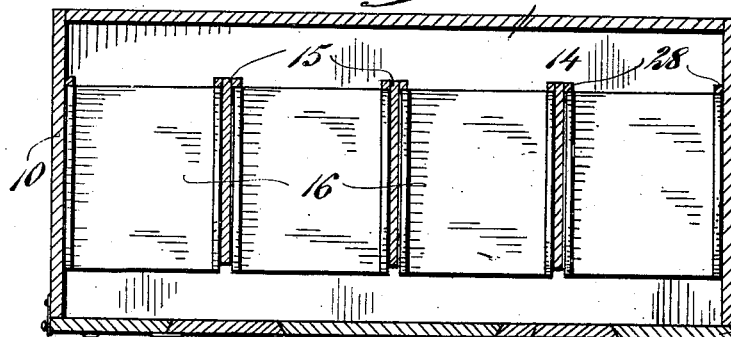

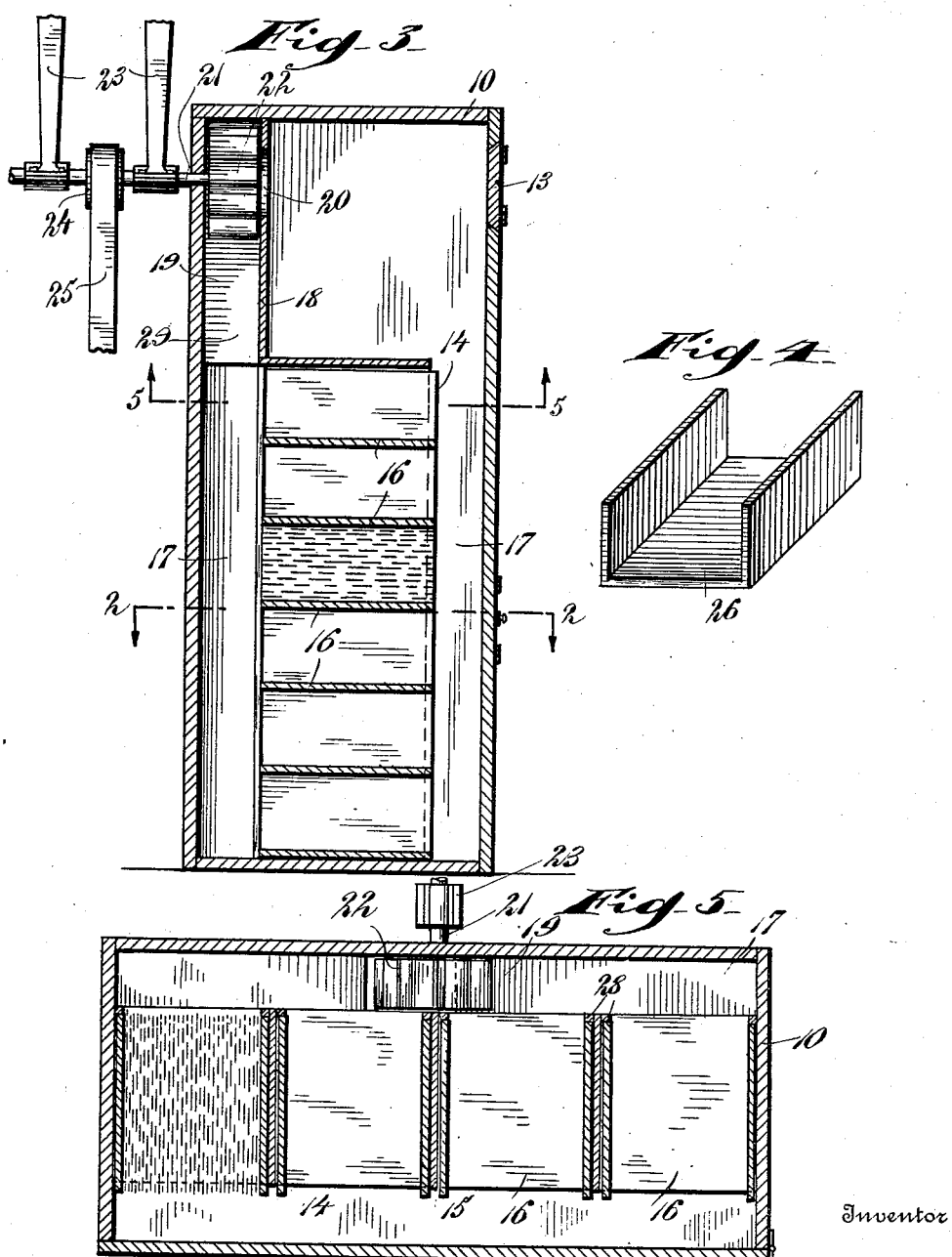

UNITED STATES PATENT OFFICE.

JOSEPH PIZZICA, OF SYRACUSE, NEW YORK.

DRYING APPARATUS.

1,070,173.  Specification of Letters Patent.  Patented Aug. 12, 1913.

Application filed August 27, 1912. Serial No. 717,351.

*To all whom it may concern:*

Be it known that I, JOSEPH PIZZICA, a citizen of the United States, residing at Syracuse, in the county of Onondaga and State of New York, have invented new and useful Improvements in Drying Apparatus, of which the following is a specification.

The invention relates to driers and has for an object to provide a drying machine particularly adaptable for drying macaroni and the like.

The invention embodies, among other features, a casing provided with a fan and having compartments therein through which air is circulated when the fan is placed in operation, a rack being arranged within the casing to support a series of pans upon which the macaroni or other product is placed so that when the device is operated the currents of air will be freely circulated through the macaroni contained on the pans, thus facilitating the drying thereof.

In the further disclosure of the invention reference is to be had to the accompanying drawings, constituting a part of this specification, in which similar characters of reference denote corresponding parts in all the views, and in which:

Figure 1 is a front elevation of the device, the door being shown in open position; Fig. 2 is a horizontal sectional view taken on the line 2—2 in Fig. 3; Fig. 3 is a vertical transverse sectional view taken on the line 3—3 in Fig. 1; Fig. 4 is a perspective view of one of the pans; and Fig. 5 is a horizontal transverse sectional view taken on the line 5—5 in Fig. 3.

Referring more particularly to the views, use is made of a casing 10 provided with a front door 11 forming a side of the casing when the door is closed, the said door being provided with openings 12, one of which is preferably formed in the upper end of the door and a plurality of which are preferably formed slightly below the medial portion of the door, suitable closures 13 being provided to close the mentioned openings, the said closures being mounted to swing on the casing and adapted to fit flush therewith as shown in Figs. 2 and 3.

A rack 14 consisting of uprights 15 and shelves 16 is mounted within the casing 10 and spaced from the front and rear sides thereof to form air compartments 17, a partition 18 being arranged in the casing 10 to extend from the rack 14 vertically and form a fan compartment 19. An opening 20 is formed in the partition 18 and a shaft 21 is journaled on the casing 10, a suitable fan 22, arranged in the compartment 19, being keyed to rotate with the shaft 21, the said shaft being journaled in suitable hangers 23 arranged exteriorly of the casing with a pulley 24 keyed to the shaft and engaged by a belt 25 having connection with a suitable driving mechanism.

Pans 26 are removably mounted on the rack 14, the said pans being adapted to be received on the shelves 16 of the rack 14, stop members 28, preferably made of strips, being secured to the uprights 15 of the rack 14 to limit the sliding movement of the pans 26 on the shelves 16, as will be readily seen by referring to Fig. 5, it being further seen by referring to Figs. 4 and 5 that the pans are open at both ends so that the air in the casing will freely circulate through the macaroni placed upon the pans.

In the use of the device described, the closures 13 are opened and the fan 22 is rotated, thus sucking in the air through the upper opening 12 and thence through the opening 20, and the circulation imparted to the air by the rotation of the fan will cause the air to freely pass through the compartments 17 and through the macaroni placed upon the pans 26 mounted upon the rack 14, thus facilitating the drying of the macaroni. If desirable the closures 13 can be moved into closed position to prevent a new supply of air from entering the casing, and the air that is already in the casing will then be recirculated therethrough by the rotating action of the fan 22 to further the drying process. In order to facilitate the circulation of the air through the compartments 17 the walls 29 of the casing 10 are preferably inclined relatively to the side walls of the casing, thus deflecting the air to provide a more rapid and more constant circulation thereof.

Having thus described my invention, I claim:

1. In a drying apparatus, the combination with a casing, of a rack supported therein and spaced from the sides of the casing to provide vertical air compartments, pans removably supported on the said rack, a door provided with inlet and outlet openings mounted to swing on the casing to form a side thereof, closures mounted to swing on the said door to normally close the said inlet and said outlet openings, a fan compartment formed in the said casing over and above one of the said air compartments, and a fan journaled in the said fan compartment for circulating air through the said air compartments.

2. In a drying apparatus, the combination with a casing, of a rack supported therein and spaced from the sides of the casing to provide vertical air compartments, pans removably supported on the said rack, a door provided with inlet and outlet openings and mounted to swing on the casing to form a side thereof, closures mounted to swing on the said door to normally close the said inlet and said outlet openings, a fan compartment formed in the said casing over and above one of the said air compartments, and a fan journaled in the said fan compartment for circulating air through the said air compartments, a plurality of the walls forming the said fan compartment being arranged to diverge from the said fan to direct the circulation of air through the said air compartments.

In testimony whereof I affix my signature in presence of two witnesses.

JOSEPH PIZZICA.

Witnesses:
 TORQUATO DE FELICE,
 DOMINICO PIAZZA.

Copies of this patent may be obtained for five cents each, by addressing the "Commissioner of Patents, Washington, D. C."